United States Patent [19]
Abraham et al.

[11] Patent Number: 5,543,918
[45] Date of Patent: Aug. 6, 1996

[54] THROUGH-THE-LENS CONFOCAL HEIGHT MEASUREMENT

[75] Inventors: David W. Abraham, Ossining, N.Y.; Danny C. Y. Wong, Ringwood, N.J.

[73] Assignee: International Business Machines Corporation, Armonk, N.Y.

[21] Appl. No.: 369,828

[22] Filed: Jan. 6, 1995

[51] Int. Cl.⁶ .................................................. G01B 11/24
[52] U.S. Cl. .................................................. 356/376
[58] Field of Search .................................. 356/372, 375, 356/376, 381, 382

[56] References Cited

U.S. PATENT DOCUMENTS

| | | | |
|---|---|---|---|
| 3,715,165 | 2/1973 | Smith | 356/376 |
| 3,768,910 | 10/1973 | Zanoni . | |
| 4,204,772 | 5/1980 | Balasubramanian . | |
| 4,355,904 | 10/1982 | Balasubramanian | 356/376 |
| 4,640,620 | 2/1987 | Schmidt | 356/376 |
| 4,748,335 | 5/1988 | Lindow et al. | 356/376 |
| 4,874,955 | 10/1989 | Uesugi et al. | 356/376 |
| 4,900,940 | 2/1990 | Nakamura | 356/376 |
| 5,033,856 | 7/1991 | Nose et al. | 356/376 |
| 5,151,609 | 9/1992 | Nakagawa et al. . | |

FOREIGN PATENT DOCUMENTS

| | | |
|---|---|---|
| DT2741807 | 3/1979 | Germany . |
| DE3528684 | 3/1986 | Germany . |
| DE3817337 | 12/1988 | Germany . |
| 63-229314 | 9/1988 | Japan . |
| WO88/07657 | 10/1988 | WIPO . |

*Primary Examiner*—Hoa Q. Pham
*Attorney, Agent, or Firm*—Ratner & Prestia

[57] ABSTRACT

Apparatus and method for measuring a change in the height of a surface or the distance between two surfaces. The invention involves converging a light beam having a beam axis and a focus onto the said surface; scanning the focus of the light beam across the surface along the beam axis using a scanning means; measuring intensity of light reflected from the surface during the scanning; determining a maximum of the light intensity; assigning to the maximum of the light intensity a position of the scanning means; repeating these steps to monitor a change in the position of the scanning means assigned to the maximum of the light intensity; and correlating such change in the position of the scanning means to a change in the height of the surface.

13 Claims, 5 Drawing Sheets

THROUGH-THE-LENS CONFOCAL HEIGHT MEASUREMENT

BACKGROUND OF THE INVENTION

1. Field of the Invention

The present invention relates to a through-the-lens system for measuring the height of a sample when neither the lens nor the sample is moved. More particularly, the invention relates to a through-the-lens system for measuring two or more heights within the sample simultaneously; for example, when a transparent surface is disposed above another surface, the height differential between the two surfaces can be measured.

2. Description of the Related Art

Prior-art optical sensors have used a number of various techniques including parallax, time elapse, triangulation, trilateration, autofocusing, stadimetry, and interferometry.

U.S. Pat. No. 4,204,772, issued to N. Balasubramanian, discloses an optical measuring system which measures height differences on a surface. A beam of light is focused by a lens onto a surface. The beam is not perpendicular, but is at an angle to the surface. If the surface moves in a normal direction, the point illuminated by the beam is displaced laterally due to the inclination of the beam. The displacement is detected by a sensor and measured by physically shifting the lens and correlating this movement to that of the surface.

Nakagawa et al., in U.S. Pat. No. 5,151,609, disclose an apparatus for detecting solid shapes. They use computer technology, operating on a series of images, to generate the shape. The object to be modelled is mounted on a z-axis table which slowly raises the object while it is imaged with a TV camera. The surface of the object must be sufficiently rough (e.g., a sintered surface) to show grain in the image at the z-elevation where the camera lens is focused. The remainder of the surface will be out of focus, and will not show grain in the image. The images are sent through a contrast extraction circuit and other electronic processes to generate an outline for each z-level. A three-dimensional model is constructed from the outlines.

German Patent Publication No. 2,741,807, published Mar. 29, 1979, shows a device in which a collimated beam of light passes through a beam splitter and is focused through a lens onto a surface, the position of which is to be measured. The reflected light from the beam passes back through the lens and is diverted by the beam splitter to a second lens which focuses onto a pinhole to a photo-receiver. The lens is oscillated back and forth. The lens oscillator and the photo-receiver are both connected to a memory and recording device. The device is limited in speed of operation by the motion of the lens.

German Patent Publication No. 3,528,684, published Mar. 6, 1986, depicts a variable-focus system for measuring surface heights. This system has a moving lens driven back and forth along the optical axis.

German Patent Publication No. 3,817,337, published Dec. 1, 1988, shows an optical surface profiler that includes a driver for moving the sample or measured object along the optical axis, along with a variable deflection device and a detector.

International publication number WO 88/07657, published Oct. 6, 1988, shows a distance measuring device using a special lens which focuses a beam into a linear focus, rather than the usual point focus. The reflected beam is diverted by a beam splitter and analyzed by a detector that measures spatial distribution of the reflected light.

Japanese Patent Publication No. 63-229,314, published Sep. 26, 1988, teaches the use of double photo-detectors to measure the inclination of a surface. The invention has a ¼-wave plate and beam splitters.

Carl Zanoni, in U.S. Pat. No. 3,768,910, discloses a system using focus modulation to detect the position and motion of a test surface. A beam of light is sent through a first lens onto a mirror which is mounted on a motion translator (transducer). The mirror oscillates sinusoidally back and forth around the focus point of the first lens. A beam reflected by the mirror is diverted by a beam splitter toward a second lens which focuses the beam onto the test surface. Light reflected from the test surface returns through the second lens and is diverted by a second beam splitter to a third lens which focuses the reflected light through an aperture onto a photodetector. The photodetector produces amplitude and phase signals that change with the position of the surface. Based on this information, a rectifier drives the mirror such that the focal plane of the beam is moved toward the sample surface. Thus, Zanoni uses a feedback loop to maintain the focal plane at the sample surface. The device disclosed in the Zanoni reference cannot effectively measure the distance between two surfaces disposed axially along the same optical axis (such as the partially-reflective surface of a transparent layer disposed above an underlying metallic layer) because the feedback loop would cause the focus to be driven toward only one of the surfaces.

SUMMARY OF THE INVENTION

The present invention provides an apparatus and a method for measuring a change in the height of a surface by converging a light beam having a beam axis and a focus onto the surface; scanning the focus of the light beam across the surface along the beam axis using a scanner; measuring the intensity of light reflected from the surface during the scanning; determining a maximum of the light intensity; assigning to the maximum of the light intensity a position of the scanner; repeating these steps to monitor a change in the position of the scanner assigned to the maximum of the light intensity; and correlating such change in the position of the scanner to a change in the height of the surface.

This invention further provides an apparatus and a method for obtaining information regarding at least two surfaces of a sample by converging a light beam having a beam axis and a focus onto the sample; scanning the focus of the light beam across the surface along the beam axis using a mirror mounted on a translational motion scanner; measuring the intensity of light reflected from the sample; determining maxima of the light intensity; assigning to the maxima of the light intensity respective positions of the scanner; and obtaining the information regarding the surfaces from the respective positions of the scanner. The information regarding the surfaces may include height changes of the surfaces or the distance between the surfaces.

DETAILED DESCRIPTION OF THE INVENTION

As used herein, "lens" refers to a focusing device and includes transparent lenses, lens systems, converging mirrors, and combinations of mirrors or lenses and mirrors.

The present invention relates to an apparatus and a method for optically measuring surface features to high precision. It allows through-the-lens height measurement of a sample surface without the need for motion of either the lens or the sample. The invention is especially adapted to measure the depth (thickness) of a transparent or translucent layer.

Figure 1:
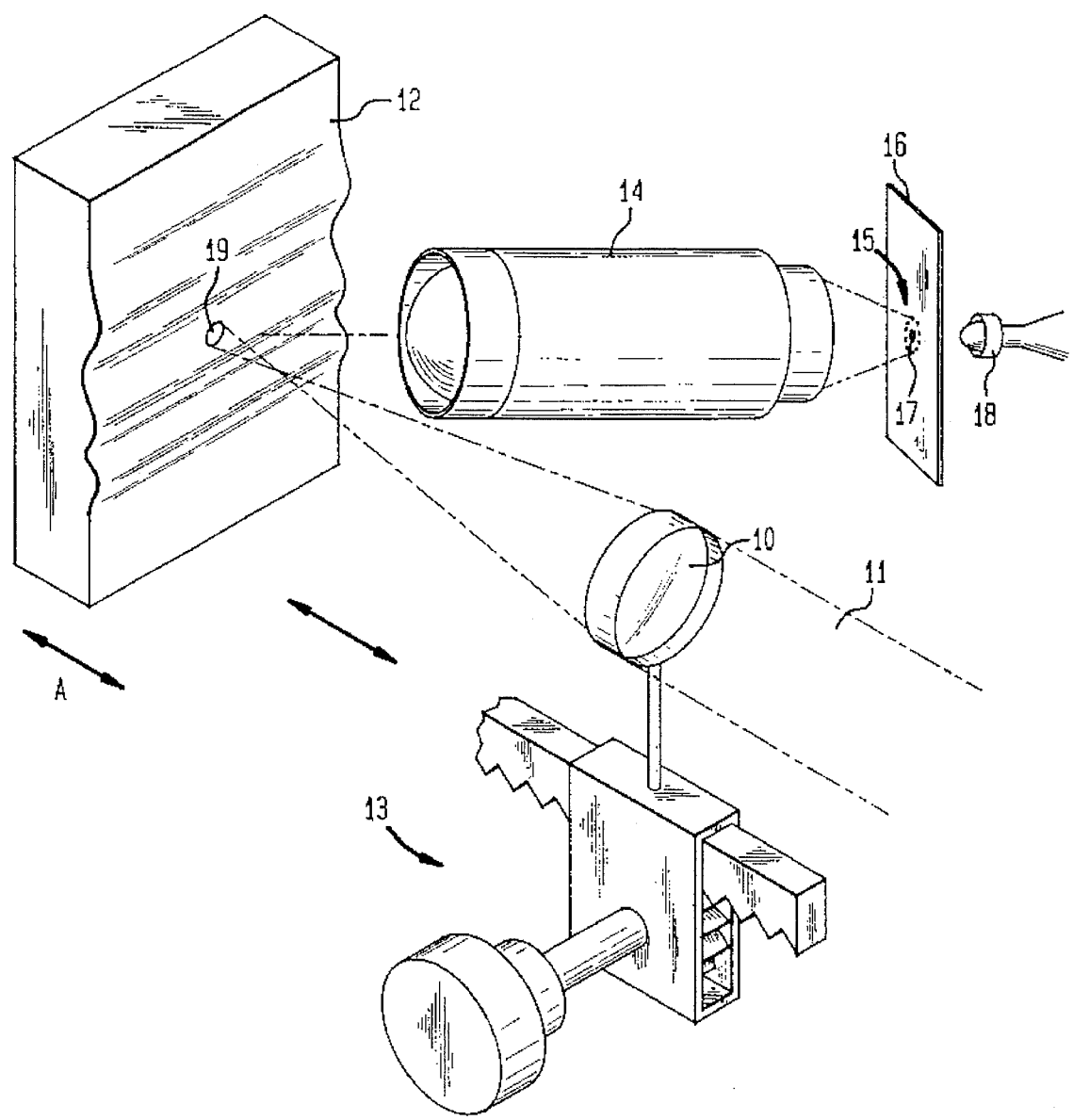
FIG. 1 is a perspective view of an optical system illustrative of the principles involved in the present invention.

Before turning to a description of an exemplary embodiment of the invention, a general concept of the invention will be presented. FIG. 1 shows an optical system that illustrates this general concept. A lens 10 converges a parallel-ray beam of light 11 onto a surface 12. The lens 10 is carried in a rack-and-pinion carrier focus device 13 for focusing the beam into a small bright spot 19 on surface 12. A telescope 14 forms an image 15 of spot 19 on a card 16 with a pinhole aperture 17. Behind the aperture is a photodiode 18 that creates an electric signal proportional to the amount of light coming through the aperture 17.

The size of the illuminated spot 19 on surface 12 does not affect the amount of light entering the objective lens of telescope 14, but it does control the amount of light passing through aperture 17. The telescopic image on card 16, of a large spot 19 on surface 12, is itself large. If the card image is large, the light is spread widely and little goes through the aperture 17.

Photodiode 18 will thus respond to movements of surface 12. Assuming that carrier 13 has been adjusted to minimize the diameter of spot 19, motion of surface 12 in the direction of the arrow "A" will cause fluctuations in the size of spot 19 as surface 12 moves along the beam line. This in turn will cause changes in the signal of photodiode 18. Thus, the arrangement of FIG. 1 allows measurement of surface height along the beam axis.

Similarly, if carrier 13 is scanned through the focus of spot 19, so that spot 19 decreases to a minimum and then increases again, the response of photodiode 18 will simultaneously increase to a maximum peak value and then decrease again.

Figure 6:
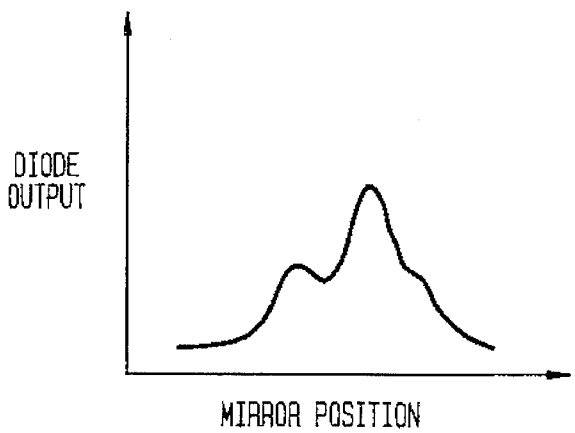
FIG. 6 is a graph of diode-measured optical power versus mirror position in accordance with an exemplary embodiment of the present invention.

Moreover, if a transparent layer (not shown) is added to surface 12, part of the light of the beam 11 will be reflected from the transparent layer and part from the non-transparent surface 12. If telescope 14 is aligned to see the reflection, then there will be two different card images and scanning will result in two peak values from photodiode 18 (as shown in FIG. 6).

Figure 2:
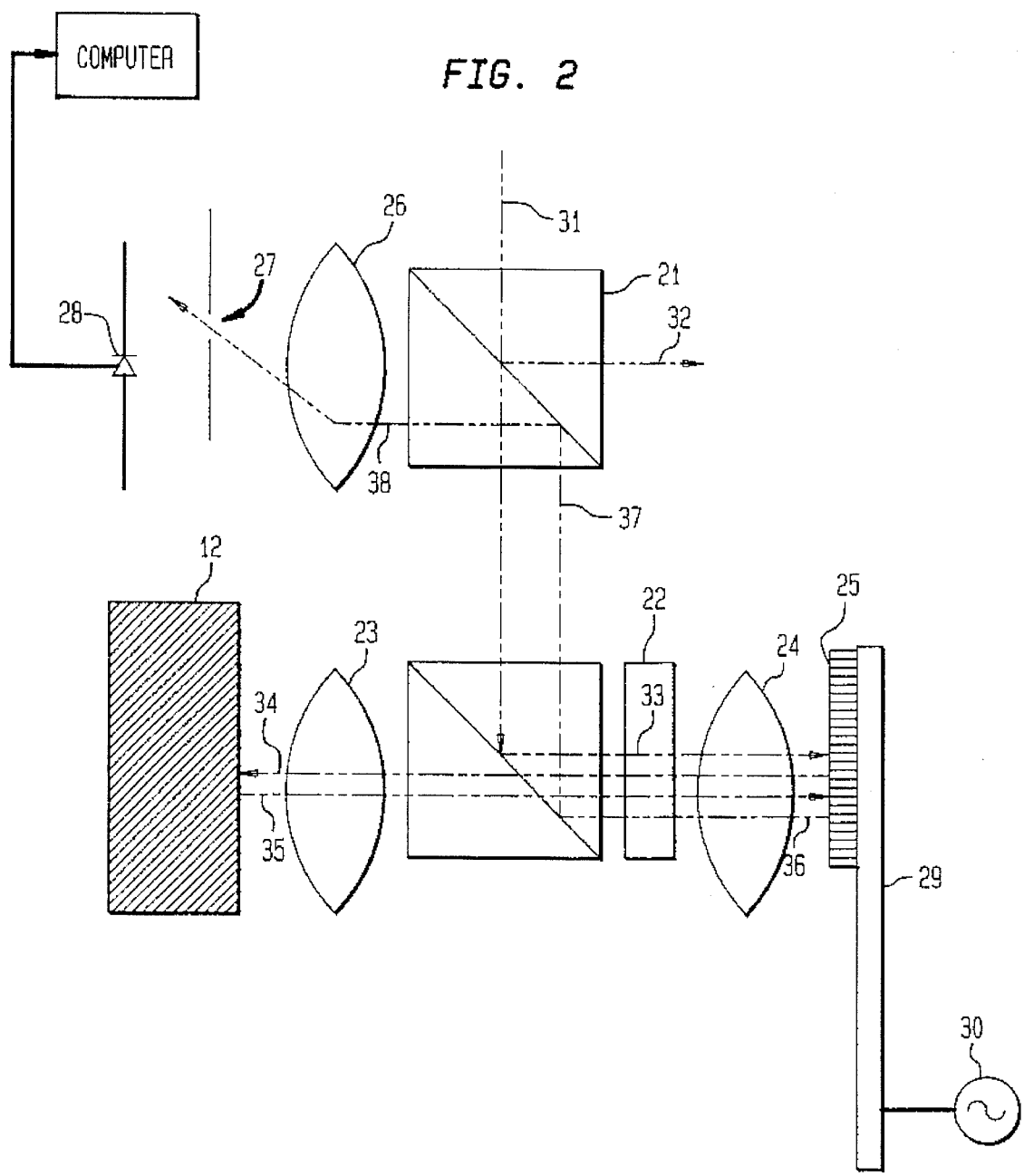
FIG. 2 is a schematic view of an exemplary embodiment of the present invention.

An exemplary embodiment of the present invention is depicted schematically in FIG. 2. Supporting structures such as a housing, position adjustments, and the like are not shown in FIG. 2 and may be of conventional design.

The exemplary embodiment of FIG. 2 includes beam splitters 20 and 21, which may be half-silvered mirrors, cemented prisms, or the like. A quarter-wave plate 22 is used in this embodiment to change the polarization state of light passing through it, e.g., from plane-polarized light to circularly polarized light. Lenses 23 and 24 are converging lenses focusing onto surface 12 and mirror 25, respectively. Lens 26 focuses through a pinhole 27 onto a photodiode 28.

Mirror 25 is mounted on a piezoelectric crystal 29. Because electricity may be used to make a piezoelectric crystal change its dimensions, such a crystal may be used as a voltage-to-motion transducer. Crystal 29 allows for motion of the mirror toward and away from lens 24 in response to voltages placed across crystal 29 by the voltage source 30.

Focused light is used in the present invention in conjunction with the equipment described above to measure surface heights. A polarized optical beam 31, such as a low-power laser beam or a non-coherent but collimated light beam, passes through the beam splitter 21. The beam is plane-polarized, with the plane of polarization into or out of the paper as seen in FIG. 2.

Polarized beam 31 passes through the beam splitter 21, losing some power to split-off beam 32, which has no function in the present invention. Polarized beam 31 continues onward to second beam splitter 20. Beam splitter 20 is preferably of the polarizing type so as to direct most of the polarized beam power sideways into beam 33.

Beam 33 passes through ¼-wave plate 22. The axis of ¼-wave plate 22 is oriented at 45° to the polarization direction, and so has the effect of changing beam 33 into a state of circular polarization. The beam then passes through converging lens 24, which converges beam 33 onto the surface of plane mirror 25. The polarization state has no effect on the convergence of beam 33 in lens 24.

Upon reflection from mirror 25, beam 33 is denoted as reflected beam 34. Reflected beam 34 expands toward lens 24, which collimates it, and passes it through ¼-wave plate 22.

In this reverse passage, the effect of the ¼-wave plate 22 is to change circular polarization back into plane polarization. The polarization direction is now rotated by 90°, however, and the polarization vector lies in the plane of the paper rather than into/out of the paper. Because of this polarization, when reflected beam 34 enters beam splitter 20 most of the reflected beam 34 passes through rather than being reflected aside.

Reflected beam 34 passes through lens 23, which may be identical to lens 24 if desired, and is focused onto the surface 12. Surface 12 is at least partially reflective. Reflected beam 34 is reflected as twice-reflected beam 35 at surface 12 and returns through lens 23 to beam splitter 20 where, still polarized in the plane of the paper, it passes through and repeats its former journey through ¼-wave plate 22 and lens 24 to mirror 25. Now denoted beam 36, it is then reflected back through lens 24, ¼-wave plate 22, and back to beam splitter 20.

Beam 36, as a result of the reflection and the two passes through ¼-wave plate 22, is plane-polarized in a direction into/out of the paper, like polarized beam 31. Thus, when it returns to beam splitter 20, beam 36 is largely diverted, now as beam 37, upward toward beam splitter 21.

A portion of beam 37 is reflected off to the left as beam 38, to a detector. The remainder of beam 37 passes through beam splitter 21 and is wasted.

The detector consists of a spatial filter (lens 26 and pinhole 27) and photodiode 28. Photodiode 28 turns light into an electrical signal. Lens 26 and pinhole 27 are aligned so that the focus of beam 38 falls directly into pinhole 27 when beam 38 is perfectly collimated. The electrical signal generated by the photodiode 28 is a measure of the intensity of beam 38.

The spatial filter may alternatively be any device that can measure maximum light intensity; for example, an area array of photodetectors and an associated circuit for finding the greatest signal output by the detectors.

In the operation of the embodiment shown in FIG. 2, the position of mirror 25 is repeatedly scanned back and forth by varying the voltage across the crystal 29. This causes the focus of twice-reflected beam 35 to scan through a region of interest across surface 12. This region of interest may be many tens of microns on either side of surface 12.

Photodiode 28 senses light reflected from surface 12 as the beam is scanned. The resulting output of photodiode 28 may be plotted on an oscilloscope screen or similar device. This output has a shape such as that of FIG. 3 and shows a maximum of light intensity reflected from surface 12. This maximum occurs because beam 38 entering photodiode 28 is collimated, which in turn results from surface 12 being located at the focus of reflected beam 34.

As described below, a particular position of mirror 25 may be assigned to the maximum of the light intensity and correlated to the location of surface 12. As subsequent scans of mirror 25 are made, the peak maximum of light intensity reflected from surface 12 will shift if the location of surface 12 changes (for example, if surface 12 is simultaneously being ablated). The position of mirror 25 assigned to the peak will thus change, and the magnitude of the change in the position of mirror 25 may be used to measure the change in the height of surface 12.

Figure 3:
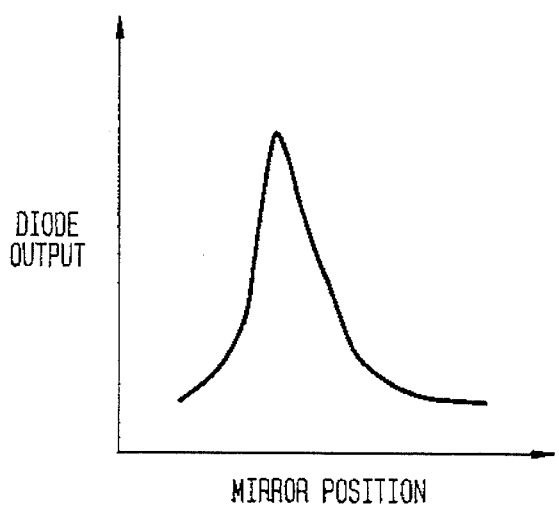
FIG. 3 is a graph of diode-measured optical power versus mirror position in accordance with an exemplary embodiment of the present invention.

In FIG. 3, the vertical axis is the photodiode output and the horizontal axis is a function of the mirror position. FIG. 3 is based on an oscilloscope trace generated by the present invention with a polished metal surface 12. The peak of the curve corresponds to the maximum light flux through the pinhole 27. The location of the curve peak along the horizontal axis of FIG. 3 indicates the location of surface 12. In any one scan of the mirror 25 position, there is a one-to-one correspondence between heights of reflective surfaces 12 and peak maxima along the horizontal axis. The surface profile in this example is for a scan of approximately 50 μm.

Surface profiles are repeatedly generated by scanning mirror 25 through the region of interest and monitoring the location of the peak output from photodiode 28. For example, voltage source 30 might generate a series of voltage ramps which cause the piezoelectric crystal 29 to gradually move toward the lens 24 from a zero-voltage position, quickly return, and then move toward the lens again. During each ramp the output from the photodiode 28 may be viewed on the y-axis of an oscilloscope, whose x-axis (sweep) is driven by voltage source 30. If surface 12 is slowly moved toward or away from lens 23 as the mirror-drive voltage is repeatedly ramped, the peaks of the oscilloscope traces will be seen to move left and right. Because the location of the peak on the oscilloscope screen indicates the location of surface 12, changes in the location of the peak indicate changes in the surface height.

The exact shape or height of the outline of the trace shown in FIG. 3 is not important in the exemplary embodiment of the present invention; only the horizontal location of the peak maximum is important. The curve peak can be measured by means other than visual inspection of an oscilloscope trace, such as automatic measurements performed by electronic devices or a computer designed or programmed for this task.

As a result of optical relationships in the system, which are discussed below, the location of the focus point of lens 23 will be a linear function of the displacement of mirror 25 for small displacements. Likewise, the location of the focus point of lens 26 will be a linear function of the displacement of mirror 25. (The displacements will not in general be equal unless the two lenses 26 and 24 have equal focal lengths). Therefore, the relationship between the curve peak location and the mirror 25 position is a linear one. This is true in spite of the non-linear relationship between the mirror 25 position and the amount of light passing through pinhole 27.

The essentially linear relationship between the peak maximum and the mirror scan is a basis for the accuracy of the present invention. The relationship between the mirror 25 position and the source 30 voltage may not be perfectly linear, however, because piezoelectric crystals such as crystal 29 may exhibit non-linear response or hysteresis. If necessary for accuracy, a calibrated scale of surface height versus mirror position can be prepared. Alternatively, a linear-response position sensor can be placed on mirror 25 to directly measure the position, and the curve peak can be compared with the sensor output. Other corrections for non-linearity of the mirror transducer will be known to those knowledgeable in the art.

If any non-linear inaccuracies existing in the mirror scanning are corrected, the curve peak position in FIG. 3 will be proportional to the height of surface 12, and measurements of the surface height may validly be based upon changes in the peak position. The accuracy of the present invention depends on numerous factors, but those affecting the sharpness of the peak and location of the peak maximum are most important. These will include the size of pinhole 27, diffraction limiting of the sharpness of focus, and the wavelength and intensity of the light beams. One method of calibrating the invention is to move surface 12 a known distance with a micrometer and observe the resulting motion of the peak of the photodiode output curve.

It will be observed that, although sinusoidal motion of mirror 25 is possible in the present invention, non-sinusoidal motion may be used to avoid hysteresis and produce more linearity. Motions such as ramp, for example, may be used. When the invention is used in conjunction with powerful laser pulses acting through lens 23 to ablate the surface 12, for example, it may be preferable that mirror 25 be scanned only between pulses. In this case, an intermittent ramp signal to piezoelectric crystal 29 could be used.

The function of the invention depicted in FIG. 2 is related to the focusing action of two converging lenses on a common optical axis. To better explain this action, two such lenses are shown schematically in FIG. 4. A point object 40 is located at the left side of the figure. Object 40 might be an illuminated pinhole or a point image formed by a lens (for example, the image of a star or a laser beam). Rays diverge from object 40 toward a lens 41, located a distance $x_o$ away from object 40. If the distance $x_o$ is equal to the focal length f of lens 41, then the beam leaving lens 41 is collimated, with parallel rays. If the distance $x_o$ is not exactly equal to f, then an image is formed by lens 41. If $x_o > f$, the image is real and located to the right of lens 41; if $x_o < f$, the image is virtual and located to the left.

The distance from lens 41 to the image is given by the thin lens formula, $1/x_i = 1/f - 1/x_o$ where f is the lens focal length, $x_o$ is the object distance, and $x_i$ is the image distance. It will be seen that if the difference between f and $x_o$ is small, then $x_i$ must be large and the image will be located a great distance away from lens 41. (This is true no matter what sign convention is used.)

The image of lens 41 is the object for lens 42, which also has focal length f. The object distance $y_o$ is equal to the inter-lens distance d, plus or minus $x_i$. If $x_i$ is great, the inter-lens distance d becomes negligible, and $1/y_i$ is approximately given by $1/y_i = 1/f - 1/y_o = 1/f - \{1/f - 1/x_o\} = -1/x_o$ or, $y_i = -x_o$.

The optical arrangement of FIG. 4 may alternatively be considered as follows: if lens 42 has the same focal length f as lens 41, and if the distance between lenses 41 and 42 is small compared to their focal lengths, then the two lenses will act much like a single lens of focal length f/2, with the object distance $x_o$ equal to the image distance $y_i$. In this situation it is apparent from symmetry considerations that the object and image displacements are equal.

The distances $y_i$ and $x_o$ are equal in magnitude when the lens focal lengths are equal. If the lenses 41 and 42 have different focal lengths, then $x_o$ and $y_i$ will lie at different distances from the lenses, and changes in $x_o$ and $y_i$ will be unequal but still proportional. In all cases the relationship is a linear one for small displacements along the optical axis.

Figure 4:
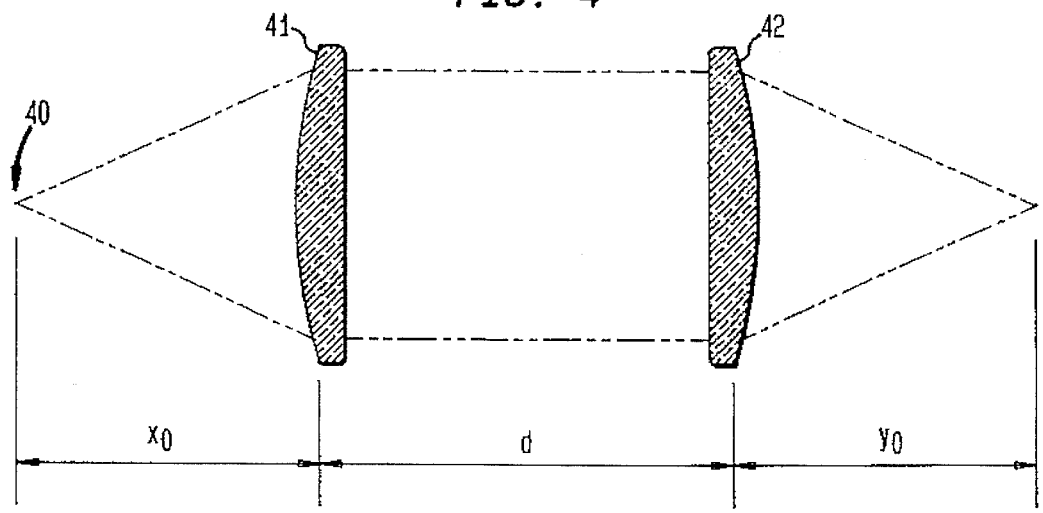
FIG. 4 is schematic view of a two-lens system illustrative of the principles involved in the present invention.

Referring again to FIG. 2, it will be appreciated that the optical system of FIG. 4 appears three times in FIG. 2: the first is where beam 33 converges to a point serving as the object for lens 24 in forming collimated reflected beam 34 that is in turn converged by lens 23 to an image point on surface 12; the second is where the image on surface 12 serves as an object for lens 23 to collimate twice-reflected beam 35 which is converged by lens 24 to a point; and where that point serves as the object of lens 24 in forming beam 36, which is converged by lens 26.

Figure 5:
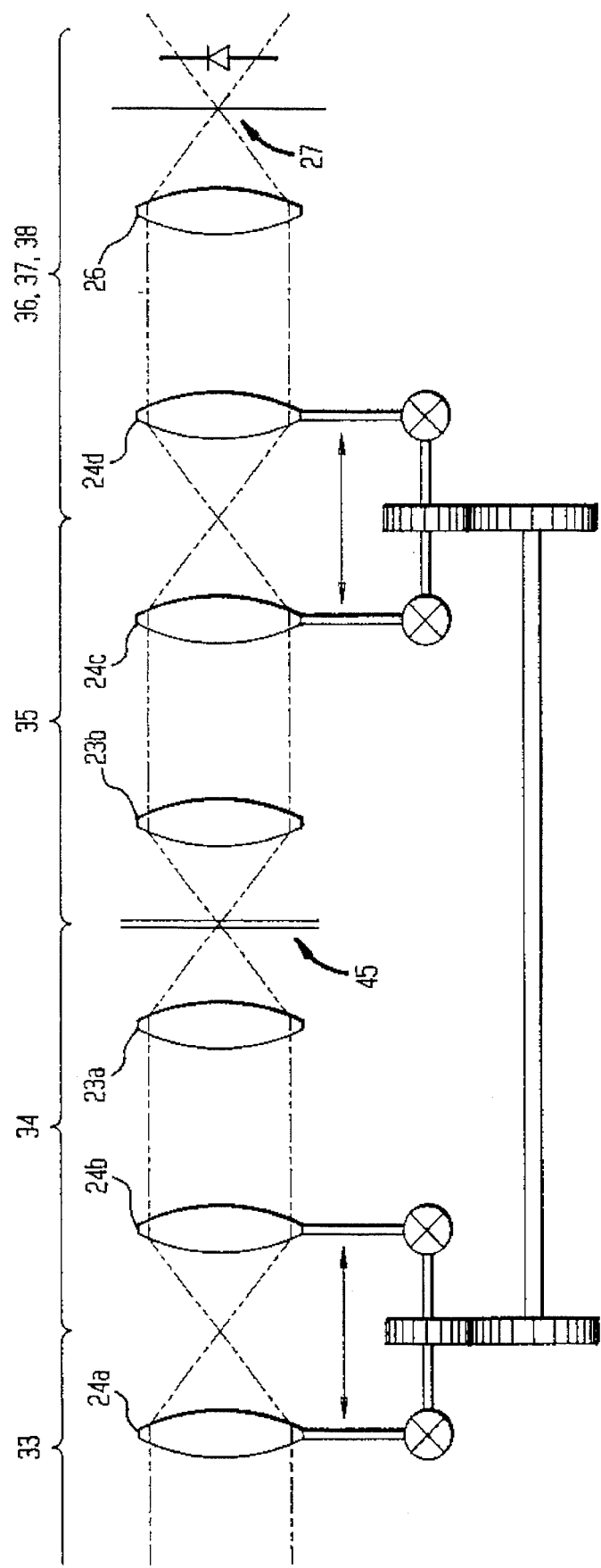
FIG. 5 is schematic view of an optical system illustrative of the principles involved in the present invention.

Now considering FIG. 5, the optical path of the invention as depicted in FIG. 2 is shown unfolded and without beam splitters, ¼-wave plate, mirror, or surface. FIG. 5 does not represent an embodiment of the invention, but rather is instructive of the principles involved in the invention. Lenses 24 and 23 are shown in multiple positions labelled as 24a–24d, 23a–23b, and may be considered as having been duplicated for the arrangement shown in FIG. 5, so that each passage of a beam through the lens "creates" one of the lenses in FIG. 5. The intersecting lines of the two beam convergences correspond to the position of mirror 25. Surface 12 is represented by a translucent screen 45, which diffusely transmits rather than diffusely reflects light. The various beams 33–38 are indicated by brackets.

In FIG. 5 collimated beam 33 is converged by lens 24a to a point, which is the object for lens 24b. The distance between lenses 24a and 24b is adjustable, corresponding to the piezoelectrically adjustable distance between lens 24 and mirror 25 of FIG. 2. The schematic linkage between the lens pair 24a, 24b and the lens pair 24c, 24d is indicative of the fact that the distance between lenses 24c and 24d in FIG. 5 also corresponds to the distance between lens 24 and mirror 25 of FIG. 2; the linkage symbolizes that these distances are in FIG. 5 always equal. Likewise, the distances between lens 23a and screen 45 is equal to the distance from screen 45 to the lens 23b, because in the arrangement of FIG. 2 these two distances are one and the same. The lenses to the left of screen 45 serve to focus; those to the right serve to create an image.

In FIG. 5, reflected beam 34 is focused by lens 23a onto the translucent screen 45, corresponding to surface 12 of FIG. 2. If the rays of reflected beam 34 entering lens 23a are parallel but the distance between screen 45 and lens 23a is not equal to the focal length of lens 23a, then the image on screen 45 will be out of focus. This out-of-focus condition may be corrected by adjusting the distance between the lenses 24a and 24b, however, according to the principle discussed above in regard to FIG. 3. The focal length of lens 24a is fixed, so the distance of the focal point from that lens does not vary; if lens 24b moves away from lens 24a, then its object distance (distance to the focal point converged by lens 24a) is increased. Thus, a motion of screen 45 to the right in FIG. 5 can be corrected by a decrease in the distance between lenses 24a and 24b; conversely, a motion of screen 45 to the left in FIG. 5 can be corrected by an increase in the distance between lenses 24a and 24b.

Light falling on the translucent screen 45 from the left will appear on the right-hand side as a light source, an object for lens 24c. Considering the arrangement of FIG. 5 to the right of screen 45, it will be seen that, because of the symmetrical placement of the lenses and because of the linked distance adjustments for lenses 24a–24d, correction of the focusing on screen 45 will result in collimated parallel rays in beams 36, 37, and 38. Such collimated rays will maximize the amount of light passing through pinhole 27.

In summary, any deviation in FIG. 5 of screen 45 away from its position may be corrected by an adjustment of the inter-lens distances 24a–24b, 24c–24d. Any deviation in FIG. 2 of surface 12 away from its position may be corrected by an adjustment of the distance between lens 24 and mirror 25, which adjustment may be made by placing the appropriate voltage across the piezoelectric crystal 30.

The arrangement of FIG. 2, which is an exemplary embodiment of the present invention, differs from that of FIG. 5 largely in that the beam is folded for compactness. The folding is done efficiently by polarization effects. The action of ¼-wave plate 22 is to modify the reflection coefficients within beam splitters 21, 20. While making use of polarization, the invention does not depend upon this effect, nor does it depend upon physical optic effects such as interference.

The embodiment of the invention depicted in FIG. 2 has an optical power efficiency of about 10%. Polarized beam 31 is supplied in the exemplary embodiment from a 488-nm argon laser delivering 10 mW of light power. Because of losses in the light path, about 3 mW illuminated surface 12 of the sample and the flux through pinhole 27 was only about 1 mW.

As compared to the hypothetical adjustment mechanism of FIG. 5, the actual piezoelectric device of FIG. 2 needs to move only half as much, because a displacement of mirror 25 by a certain amount increases the total light path from lens 24 and back again by twice that amount.

Measurement of surface height is based on the fact that changes in the height of surface 12 can cause changes in the output of photodiode 28. Because of the optical relationships discussed above, the amount of light passing through pinhole 27 is a function of the relationship between the distance from lens 24 to mirror 25 and the distance from lens 23 to the surface 12.

When these two distances are in proper relation, beam 36 from lens 24 remains collimated and beam 38 remains optimally focused onto pinhole 27. If the two distances are not in proper relation (for example, if surface 12 moved while mirror 25 held stationary), then beam 38 will be de-focused on pinhole 27.

The relationship that exists between an uncompensated change in either the mirror 25 to lens 24 distance or in the surface 12 to lens 23 distance, and the amount of light passing through pinhole 27, is not a linear relationship. The non-linearity is due to physical optics effects and to the geometry of a converging light cone intersecting a pinhole. Because the light power in all cross sections of a beam is constant, the light intensity in a conical beam from a lens decreases as the inverse square of the distance from the cone apex (the focal point).

In addition, the electric signal output from photodiode 28 may not be a linear function of the amount of light passing through pinhole 27. Because of these effects, when the optical geometry is varied the signal output from photodiode 28 will peak when beam 38 is focused on pinhole 27 and will fall off when the focal point falls beyond or short of pinhole 27.

The present invention allows the simultaneous measurement of two or more heights at the same time. Unlike known devices, which measure heights at two surface positions laterally displaced, the present invention can measure, at a single surface position, two distinct surfaces disposed one above the other at different heights. An example is a metal or ceramic base surface covered with a transparent or translucent layer of material, such as photoresist. This is possible because the upper surface will partially reflect the incident light and the lower surface will reflect the transmitted light, causing peaks of the photodiode output corresponding to both heights. Such a double peak is shown in FIG. 6, which was generated by the invention from an exemplary silicon surface covered with a layer of polyimide photoresist. Distinct peaks corresponding to the polyimide surface and the underlying metal surface are visible. The difference between the peaks is the height of the surface layer. The entire scan covers approximately 50 µm.

The amplitude of the peaks depends on the reflectance of the surfaces and the extent of any absorption of the light reflected from the surfaces. The order of the peaks will depend upon the polarity of the voltage ramp driving the crystal 29. If the mirror moves to the left in FIG. 2 as time passes, and the oscilloscope traces conventionally from left to right, the peak on the left will be the top layer of photoresist.

when the invention is used to measure transparent layer thickness, the index of refraction of the material must be taken into account because the cone described by the converging rays from lens 23 will become more acute as the rays enter the material. An exemplary 9-micron-thick layer of polyimide (which was the sample used to generate FIG. 6) gave a raw measure of 10.4 microns thickness because of this effect. The thickness was measured independently by microscopic examination of the edge. The raw measurement correlated with the known index of refraction of the photoresist material for this example.

The horizontal location of the peaks can be determined by clip levels, if the peaks are comparable in height, as will be understood by those skilled in the art. If not, or if more precise location of the peak is desired, curve-fitting can be used. Measured values along the peak can be fitted to a theoretically plausible curve (for example, a Lorentzian or Gaussian) by conventional mathematical methods. This approach can be used with multiple, closely set peaks such as those shown in FIG. 6, and can easily be automated for computer solution by those skilled in the art.

An exemplary application of the present invention is in microelectronics technology, where the invention may be used to monitor the depth of ablation holes (or vias) burned through photoresist by a high-power excimer laser. The high repetition rate of the ablating laser pulses makes it impractical to move any part of the system or the work between pulses. The present invention uses a mirror mounted on a piezoelectric crystal as the focus-changing element, to minimize the mass of moving parts and to obtain fast response.

It will be seen that even small height differences can be measured with the present invention and that the accuracy is high. The width of the curves of FIG. 6 is on the order of five microns and the separation between the peaks can easily be located to a fraction of a micron. When the peaks are substantially separated, relative movement of the peaks can be determined with nanometer sensitivity, depending on laser power, focal conditions, and other optical considerations.

Figure 7:
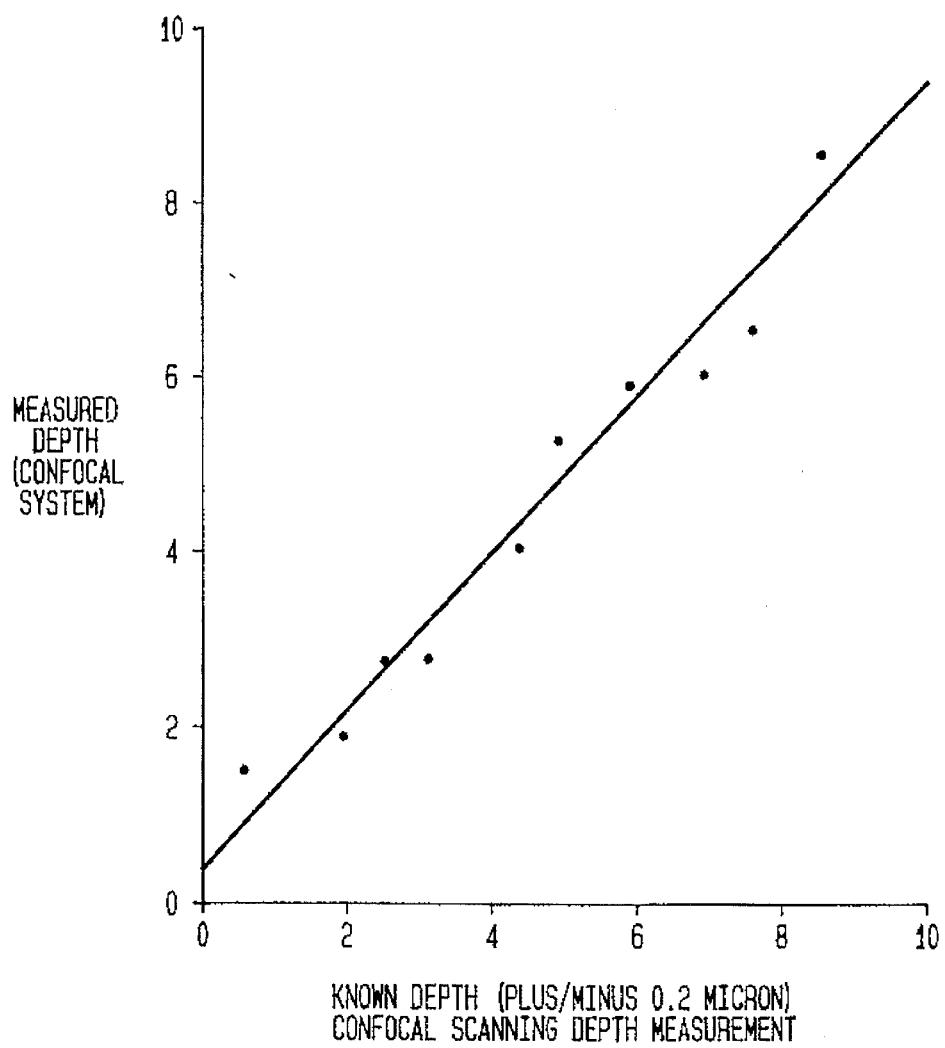
FIG. 7 is a graph comparing results obtained in accordance with this invention versus those measured by a standard method that does not include the advantages of the present invention.

Moreover, the accuracy of the height measurements of the present invention is high, as shown in FIG. 7. This figure is a plot of the depth of ablation holes in a surface as measured by the present invention (y-axis) against the known depth (x-axis). The independent measurement was made with a confocal viewing microscope and a micrometer table. The relationship approaches equality.

The exemplary embodiment of the invention makes measurements between high-power ablation pulses repeated at, for example, 20 Hz, with less than 50 milliseconds for each measurement. The present invention measures very quickly because only one scan is needed to locate the surfaces. Prior art devices that rely on harmonic analysis (e.g., Zanoni) must maintain a sinusoidal vibration for a time that is sufficiently long to avoid frequency smearing caused by clipping the signal. Such devices focus on the surface and use feedback loops to maintain this focus on the surface, measuring changes in mirror positions to track the surface.

By contrast, the present invention continuously scans the focus through the region of interest across the surface of the sample avoiding the necessity of a feedback loop and enabling measurement of two surfaces in the vertical plane (parallel to the axis of the beam directed onto the sample). Moreover, because Zanoni-type devices must oscillate sinusoidally to initially detect the focus, they cannot find a surface by scanning; instead, they must combine oscillation with a scan that is slow enough to not distort the harmonics, which are used to locate the surface. (A sine wave motion will be seriously distorted by a superimposed translation, coming to resemble a staircase function when the translation speed equals the sinusoidal speed maximum; the distortion will produce multiple harmonics that will interfere with harmonic analysis.)

The present invention permits very fast and accurate measurements of surface heights, and can measure the depths of transparent or translucent layers. It uses components which are well-known, readily available, and inexpensive.

Although the invention has been described in terms of an exemplary embodiment, it is contemplated that is may be practiced as outlined above with modifications within the spirit and scope of the appended claims.

What is claimed:

1. An apparatus for measuring a change in height of a surface comprising:

(a) optical means including stationary lenses for converging a light beam, having a beam axis and focus, onto said surface;

(b) means for continuously scanning the focus of said light beam perpendicularly across said surface along said beam axis;

(c) means for measuring intensity of light reflected from said surface during a scan of said focus;

(d) means for determining a maximum of the light intensity;

(e) means for assigning to said maximum of the light intensity a position of said scanning means;

(f) means for monitoring a change in said position of said scanning means assigned to said maximum; and (g) means for correlating said change in said position of said scanning means to a change in the height of said surface.

2. The apparatus according to claim 1, wherein said light beam has a folded optical path that allows simultaneous measurement of surface height by the apparatus and treatment of the surface by another light beam.

3. The apparatus according to claim 1, wherein said scanning means comprises a mirror mounted on a translational motion scanner.

4. The apparatus according to claim 3, wherein said scanner is a piezoelectric crystal oscillated by varying a voltage drive signal to the crystal.

5. The apparatus according to claim 4, wherein said drive signal oscillates non-sinusoidally.

6. The apparatus according to claim 5, wherein said drive signal includes a ramp portion linearly increasing with time.

7. An apparatus for measuring the distance between at least two surfaces on a sample comprising:

(a) optical means including stationary lenses for converging a light beam, having a beam axis and a focus, onto said sample;

(b) means for continuously scanning the focus of said light beam perpendicularly across said surfaces along said beam axis;

(c) means for measuring intensity of light reflected from said sample during a scan of said focus;

(d) means for determining maxima of the light intensity;

(e) means for assigning to said maxima of the light intensity respective positions of said scanning means; and (f) means for correlating said respective positions of said scanning means to the distance between said surfaces.

8. A method for measuring a change in the height surface comprising the steps of:

(a) converging a light beam, having a beam axis and a focus, onto said surface using a stationary lens:

(b) continuously scanning the focus of said light beam perpendicularly across said surface along said beam axis using a scanning means;

(c) measuring intensity of light reflected from said surface during said scanning;

(d) determining a maximum of the light intensity;

(e) assigning to said maximum of the light intensity a position of said scanning means;

(f) repeating steps (a) through (e) to monitor a change in said position of said scanning means assigned to said maximum of the light intensity; and (g) correlating said change in said position of said scanning means to a change in the height of said surface.

9. The method for measuring a change in the height of a surface as claimed in claim 8 wherein said scanning means comprises a mirror mounted on a piezoelectric crystal oscillated by non-sinusoidally varying a voltage drive signal to the crystal.

10. A method for obtaining information regarding at least two surfaces of a sample comprising the steps of:

(a) converging a light beam, having a beam axis and a focus, onto said sample using a stationary lens;

(b) continuously scanning the focus of said light beam perpendicularly across said surfaces along said beam axis using a scanning means;

(c) measuring intensity of light reflected from said sample;

(d) determining maxima of the light intensity;

(e) assigning to said maxima of the light intensity respective positions of said scanning means; and (f) obtaining said information regarding said surfaces from said respective positions of said scanning means.

11. The method for measuring a change in the height of a surface as claimed in claim 10 wherein said scanning means comprises a mirror mounted on a piezoelectric crystal oscillated by non-sinusoidally varying a voltage drive signal to the crystal.

12. The method for obtaining information regarding at least two surfaces of a sample as claimed in claim 11 wherein said information is a change in height of said surfaces.

13. The method for obtaining information regarding at least two surfaces of a sample as claimed in claim 11 wherein said information is a distance between said surfaces.

* * * * *